(12) United States Patent
Novack et al.

(10) Patent No.: US 8,613,059 B2
(45) Date of Patent: Dec. 17, 2013

(54) METHODS, SYSTEMS AND COMPUTER PROGRAM PRODUCTS FOR SECURE ACCESS TO INFORMATION

(75) Inventors: Brian M. Novack, St. Louis, MO (US); Jerry Birkes, Altamonte Springs, FL (US); Alton W. Drake, II, Atlantic Highlands, NJ (US); Gary A. Toretti, Flower Mound, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 465 days.

(21) Appl. No.: 12/641,779

(22) Filed: Dec. 18, 2009

(65) Prior Publication Data

US 2011/0154452 A1    Jun. 23, 2011

(51) Int. Cl.
*G06F 15/16* (2006.01)
*G06F 12/00* (2006.01)
*G06F 17/30* (2006.01)
*G06F 21/00* (2013.01)
*G06F 13/22* (2006.01)

(52) U.S. Cl.
USPC ...... 726/5; 726/18; 726/19; 726/28; 713/186; 709/219

(58) Field of Classification Search
USPC ...................... 726/2–8, 22–33; 709/225, 229; 713/150, 168–174, 182–186
See application file for complete search history.

(56) References Cited

U.S. PATENT DOCUMENTS

| | | | |
|---|---|---|---|
| 5,996,076 A | 11/1999 | Rowney et al. | |
| 6,338,138 B1 | 1/2002 | Raduchel et al. | |
| 6,385,701 B1 | 5/2002 | Krein et al. | |
| 6,678,731 B1 | 1/2004 | Howard et al. | |
| 6,847,953 B2 | 1/2005 | Kuo | |
| 6,879,965 B2 | 4/2005 | Fung et al. | |
| 6,898,711 B1 | 5/2005 | Bauman | |
| 6,931,382 B2 | 8/2005 | Laage et al. | |
| 6,934,858 B2 | 8/2005 | Woodhill | |
| 7,016,875 B1 | 3/2006 | Steele et al. | |
| 7,089,310 B1 | 8/2006 | Ellerman et al. | |
| 7,191,467 B1 | 3/2007 | Dujari et al. | |
| 7,231,661 B1 | 6/2007 | Villavicencio et al. | |
| 7,251,827 B1 | 7/2007 | Guo et al. | |
| 7,257,581 B1 | 8/2007 | Steele et al. | |
| 7,305,470 B2 | 12/2007 | Tom et al. | |
| 7,334,013 B1 | 2/2008 | Calinov et al. | |
| 7,401,235 B2 | 7/2008 | Mowers et al. | |
| 7,421,731 B2 | 9/2008 | Mitchell et al. | |

(Continued)

OTHER PUBLICATIONS

U.S. Appl. No. 11/248,050, filed Oct. 12, 2005, 33 pages.

(Continued)

*Primary Examiner* — Evans Desrosiers
(74) *Attorney, Agent, or Firm* — Hartman & Citrin LLC

(57) ABSTRACT

Methods for secure communications are provided. The methods include creating a safe user account on a secure access system, wherein creating an account includes provision of at least one strong authenticator to be associated with a user of the secure access system; providing a unique login and the at least one strong authenticator associated with the user to the secure access system to gain access to information associated with a referring organization, the referring organization being registered with the secure access system; and accessing the information associated with the referring organization based on the unique login and the at least one strong authenticator provided to the secure access system. Related systems and computer program products are also provided.

20 Claims, 8 Drawing Sheets

(56) References Cited

U.S. PATENT DOCUMENTS

| | | |
|---|---|---|
| 7,500,262 B1 | 3/2009 | Sanin et al. |
| 7,716,469 B2 | 5/2010 | Bhatnagar et al. |
| 8,069,120 B2 | 11/2011 | Buehler et al. |
| 8,195,574 B2 | 6/2012 | Buehler et al. |
| 2002/0073045 A1 | 6/2002 | Rubin et al. |
| 2002/0099952 A1 | 7/2002 | Lambert et al. |
| 2003/0172090 A1 | 9/2003 | Asunmaa et al. |
| 2003/0177388 A1 | 9/2003 | Botz et al. |
| 2003/0188193 A1 | 10/2003 | Venkaramappa |
| 2004/0230831 A1 | 11/2004 | Spelman et al. |
| 2005/0005133 A1 | 1/2005 | Xia et al. |
| 2005/0149759 A1 | 7/2005 | Vishwanath et al. |
| 2005/0154887 A1 | 7/2005 | Birk et al. |
| 2005/0182684 A1 | 8/2005 | Dawson |
| 2005/0193093 A1 | 9/2005 | Mathew et al. |
| 2006/0085345 A1 | 4/2006 | Khandelwal et al. |
| 2006/0242427 A1* | 10/2006 | Ruzyski et al. ............... 713/186 |
| 2006/0277218 A1 | 12/2006 | Franco et al. |
| 2007/0197938 A1* | 8/2007 | Tyson et al. .................... 600/587 |
| 2007/0266257 A1* | 11/2007 | Camaisa et al. .............. 713/182 |
| 2008/0244039 A1* | 10/2008 | Wertz ............................ 709/219 |
| 2009/0138953 A1 | 5/2009 | Lyon |
| 2009/0183003 A1 | 7/2009 | Haverinen |
| 2010/0107225 A1* | 4/2010 | Spencer et al. .................... 726/4 |
| 2010/0299734 A1 | 11/2010 | Lynch et al. |

OTHER PUBLICATIONS

Microsoft.Net Passport Technical Overview, 2001, entire article.
U.S. Office Action dated Jun. 8, 2009 in U.S. Appl. No. 11/248,050.
U.S. Office Action dated Nov. 6, 2009 in U.S. Appl. No. 11/248,050.
U.S. Office Action dated Mar. 11, 2010 in U.S. Appl. No. 11/248,050.
U.S. Office Action dated Jul. 15, 2010 in U.S. Appl. No. 11/248,050.
U.S. Office Action dated Nov. 8, 2010 in U.S. Appl. No. 11/248,050.
U.S. Office Action dated Feb. 19, 2011 in U.S. Appl. No. 11/248,050.
U.S. Office Action dated May 24, 2011 in U.S. Appl. No. 11/248,050.
U.S. Office Action dated Oct. 13, 2011 in U.S. Appl. No. 11/248,050.
U.S. Office Action dated Dec. 4, 2012 in U.S. Appl. No. 11/248,050.

* cited by examiner

METHODS, SYSTEMS AND COMPUTER PROGRAM PRODUCTS FOR SECURE ACCESS TO INFORMATION

BACKGROUND OF THE INVENTION

The present application relates generally to communications, and, more particularly, to methods, systems, and computer program products for secure online communications Public and private usage of distributed processing systems, such as the Internet, and other information wide networks, has become commonplace in all avenues of life, home, work, recreation and the like. Conducting commerce over such distributed systems, such as e-business, has become very popular. Users of e-business and other identity sensitive applications may be required to provide a user identifier and a password, for example, a PIN number, before the user is permitted access to such applications. When these and other applications operate within a multiple website environment, each website must get involved in a given transaction to authenticate the user prior to allowing access to these websites. A process authenticates a user generally by verifying that the user password is properly associated with the user identifier.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Some embodiments provide methods for secure communications. The method includes creating a safe user account on a secure access system, wherein creating an account includes provision of at least one strong authenticator to be associated with a user of the secure access system; providing a unique login and the at least one strong authenticator associated with the user to the secure access system to gain access to information associated with a referring organization, the referring organization being registered with the secure access system; and accessing the information associated with the referring organization based on the unique login and the at least one strong authenticator provided to the secure access system.

In further embodiments, the method may further include attempting to access the referring organization by logging in from a legacy logon screen associated with the referring organization; and creating the safe user account on the secure access system responsive to the attempt to access the referring organization.

In still further embodiments, creating may further include accessing the legacy logon screen associated with the referring organization; selecting a link associated with secure access system registration for the secure access system; selecting a link to create the safe user account on the secure access system; providing a primary email address to be associated with the safe user account; receiving a challenge email at the primary email address; responding to the challenge email; selecting at least one type of strong authenticator to be associated with the safe user account responsive to a proper response to the challenge email; receiving an email from the secure access system at the primary email address including strong authenticator setup information for the selected at least one type of strong authenticator; and providing information associated with the selected at least one type of strong authenticator to the secure access system to finalize creation of the safe user account.

In some embodiments, accessing may further include accessing the legacy logon screen of the referring organization; selecting a secure access registration link that is configured to connect to a web site associated with the secure access system; selecting an option to login to the network of the referring organization as a secure access user using the unique login, the at least one strong authenticator and the primary email address associated with the user; registering a web site of the referring organization; providing a user ID associated with the referring organization and the at least one strong authenticator at the legacy logon screen of the referring organization; and receiving a registration confirmation email at the primary email address.

In further embodiments, accessing may further include accessing the legacy logon screen of the referring organization; providing a user ID associated with the referring organization and the at least one strong authenticator at the legacy logon screen of the referring organization; and obtaining secure access to the information associated with the referring organization if the at least one strong authenticator is determined to be valid.

In still further embodiments, a type of the at least one strong authenticator may include voice biometrics, soft token, fob token, fingerprint biometrics, passwords, pass phrases, PIN and/or device authenticator.

In some embodiments, the at least one strong authenticator associated with the user of the secure access system may correspond to a level of security of the information associated with the referring organization.

In further embodiments, the referring organization may define the at least one type of strong authenticator to be associated with the information of the referring organization.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
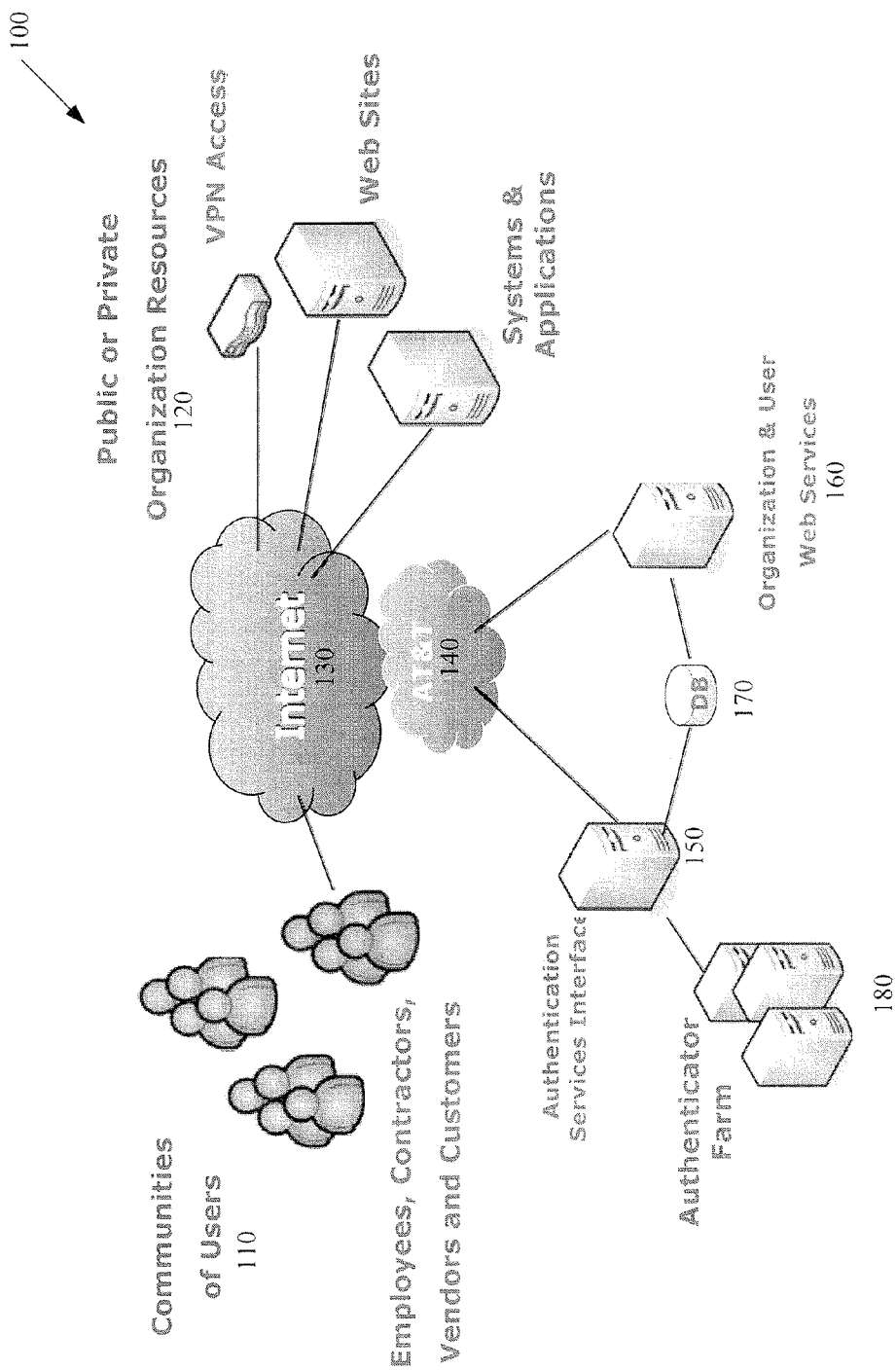
FIGS. 1 and 2 are block diagrams of a system including a secure access system in accordance with some embodiments.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another.

Exemplary embodiments are described below with reference to block diagrams and/or flowchart illustrations of methods, apparatus (systems and/or devices) and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.). Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Some embodiments discussed herein provide methods, systems and computer program products for authentication that supports a variety of authenticators and authentication methods that are tied to a single root identity. In other words, once a user creates a secure login, the user, such as a customer, vendor, employee and the like, may access the information associated with a referring organization using this very secure login. Thus, some embodiments discussed herein provide, for example, a secure online experience using strong/secure authentication services by creating a cloud based authentication clearinghouse, for example, Token, Voice Fingerprint, Biometric and the like as will be discussed further below with respect to FIGS. 1 through 8.

In some embodiments, a service or clearing house is provided that is configured to bind the root identity to each local user identification, which allows authentication to occur against the root to be bound to the view of the individual user. Thus an interface that supports enrollment, management and verification functions that range from simple pin/password, to risk based methods such as source IP history or PC component fingerprinting, soft token generators, hard token generators, biometrics (voice, fingerprint, etc.) and does the authentication for the user on behalf of the subscribing company may be provided. Thus, as discussed above, users would only need to enroll in the secure access system once to establish a root identity and set of authenticators. As will be discussed further herein, each authenticator would need initialization/setup based on its requirements, such as fingerprint swipes, voice samples, and the like, using authentication device 347 discussed below with respect to FIG. 3. Embodiments discussed herein may be easily adapted to serve managed services by restricting data or establishing its own private environment.

Embodiments of the present invention may provide value to the organization implementing the embodiments. Customer Reliability and scalability of the service is the responsibility of the organization to achieve good among the competition. Some embodiments discussed herein may aid the organization in reducing the number of incidents of fraud, reducing financial loss attributed to fraud Gain, keeping user trust, getting better results in increasing growing user confidence and defending against brand erosion. Furthermore, some embodiments may help to reduce the occurrence of identity theft, provide more choices in authenticator types. Embodiments discussed herein can be used across multiple access points and may increase confidence in the security being provided by the organization.

Referring first to FIG. 1, a block diagram illustrated a simplified secure access system 100 according to some embodiments will be discussed. As illustrated in FIG. 1, the secure access system in accordance with some embodiments may include a community of users 110, public or private organization resources 120, a network 130, a company network 140, an interface to the authentication services 150 according to some embodiments, organization and user web services 160, a database 170 and authenticator servers 180 in accordance with some embodiments.

As is further illustrated in FIG. 1, the communities of interest, can be, for example, employees, contractors, vendors, customers or the like. It will be understood that the communities of interest are not limited to the specific communities discussed herein, for example, the communities of interest may include partners, students, nurses, frequent flyers, anonymous users, road warriors, airmen, soldiers, patients, administrators, physicians, teachers or any other community that could use embodiments discussed herein.

The community of users is connected to the public/private organization resources 120 via a network 130, such as the Internet. According to some embodiments, a company network 140, such as AT&T, sits between the Internet 130 and web and user services 160 of the organization and between the Internet 130 and the authentication services 150 and authenticator servers 180 in accordance with some embodiment. A database 170 sits between the authentication services interface 150 and web and user services of the organization 160. Although a single database 170 is shown, embodiments discussed herein may include more than one database 170 without departing from the scope of embodiments discussed herein.

Thus, because the secure access system 100 includes authentication services 150 in accordance with embodiments between the Internet 130 and the web and user services of the organization 160, some embodiments provide a secure online experience using strong/secure authentication services by creating a cloud based authentication clearinghouse, for example, Token, Voice Fingerprint Biometric and the like as will be discussed further below with respect to FIGS. 2 through 8.

Figure 2:
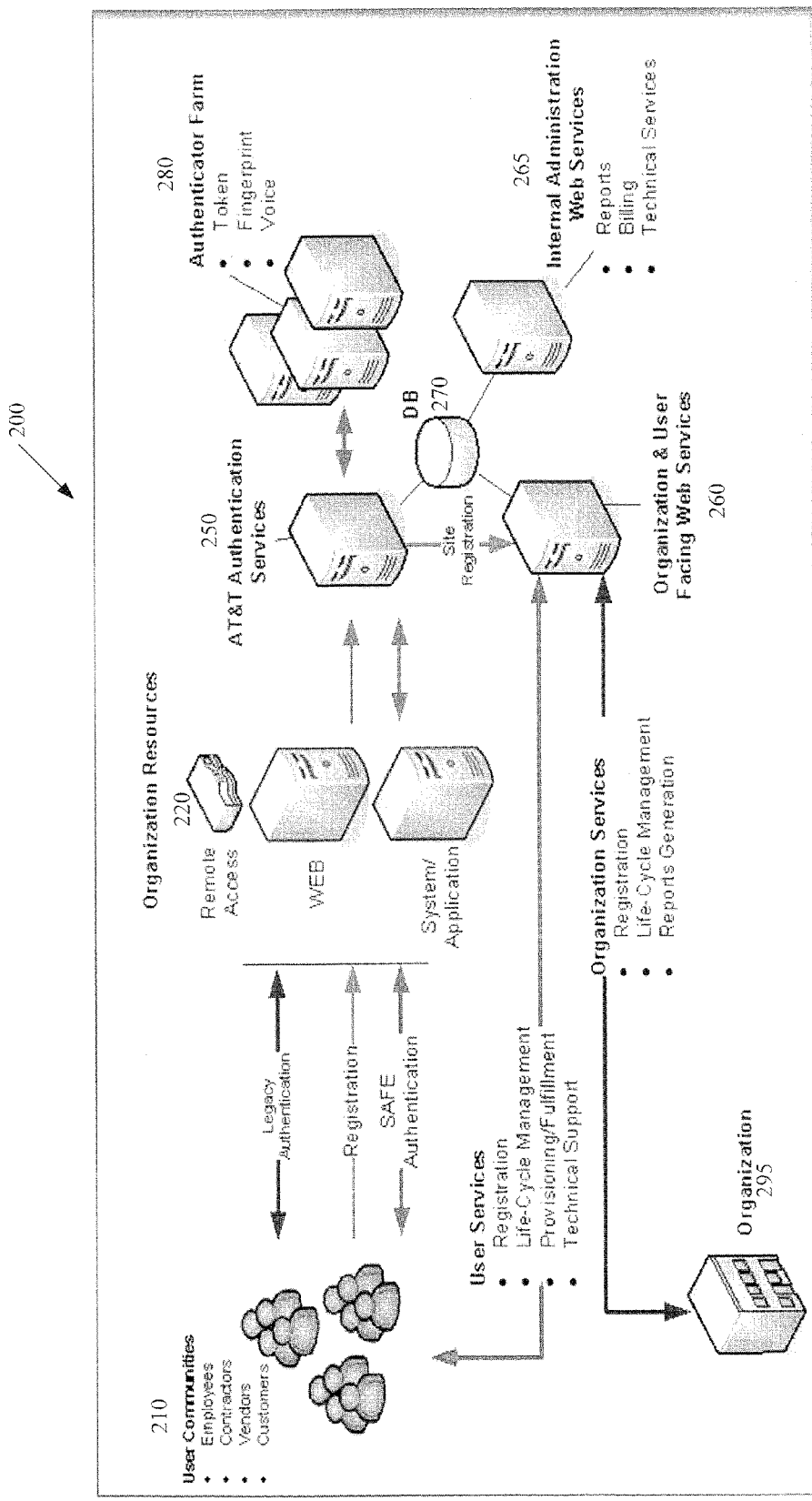

Referring now to FIG. 2, a more detailed block diagram of a system 200 in accordance with some embodiments will be discussed. As illustrated in FIG. 2, the system 200 includes user communities 210, public or private organization resources 220, an interface to the authentication services 250 according to some embodiments, organization and user web services 260, internal administration web services 265, a database 270 and authenticator servers 280 and the organization itself 295 in accordance with some embodiments.

As is further illustrated in FIG. 2, the user communities 210, can be, for example, employees, contractors, vendors, customers or the like. As discussed above, the communities of interest are not limited to the specific communities discussed herein. The organization resources 220 may include, but are not limited to, remote access, Web and systems/application associated with the organization. As further illustrated in FIG. 2, the web services of the organization 295 may be both organization and user facing web services 260 as well as internal administration web services 265, such as reports, billings, and technical services. The authenticator servers 280 may be used to obtain and/or store authenticators, for example, password, pass code, PIN, device authenticators, soft token, token fob, voice and/or fingerprint biometrics and the like, that may be used by the secure access system to provide secure web services.

Operations for first user registration and existing user resource registration will now be discussed with respect to FIG. 2. A user, for example, an employee, contractor, vendor, customer or other member of the user communities 210, accesses the organization's resources 220 through a legacy logon screen associated with the organization 295. An organization 295 that is being accessed by a user according to embodiments discussed herein may be referred to herein as the "referring organization" as the user is referred from a legacy logon screen of the organization to the safe access system in accordance with some embodiments discussed herein. It will be understood that the referring organization may be a network, VPN, or any organization that may benefit from a secure access system in accordance with some embodiments discussed herein. For example, a secure access system in accordance with some embodiments discussed herein may be used to secure a single sign on (SSO) application in some embodiments.

The user selects a link associated with the safe access system and is redirected to a web site associated with the safe access system 250. The user selects a link on the safe access system web site to create a new safe access account and provides a primary e-mail address to be associated with the safe access account. The safe access system 250 sends a challenge email to the primary email address provided and the user replies to this challenge email. The challenge email may include, for example, a URL link for the user to return to the system. If the user does not reply to the challenge email, the user cannot continue with the registration on the safe access system.

Upon receipt of a valid response to the challenge email, the user selects one or more types of authenticators to be used with the safe access account. For example, the authenticator may be PIN, password, pass code, device authenticator, voice biometrics, soft token, fob token and/or fingerprint biometrics. It will be understood that any combination of these types or other types of authenticators known to those having skill in the art may be used without departing from the scope of embodiments discussed herein. In some embodiments, the referring organization may designate which types of authenticators are acceptable for that particular organization. For example, a referring organization associated with very confidential information may require more secure authenticators, such as biometrics, whereas a referring organization associated with less secure information may only require a password.

If the user chooses voice biometrics, the user's voice itself is used to identity the user. The user's voice can be provided, for example, through a computer or through a mobile device, for example, authenticator device 347 of FIG. 3. This type of authenticator provides secure access to information, such as online e-commerce, account access or banking information.

If the user chooses a soft token or a fob token authenticator, a passcode associated therewith may change periodically, for example, every 60 seconds. Token options include software loaded on a mobile device or PC or a hard token FOB device. This type of authenticator provides secure access to information, such as online e-commerce and banking information. Token authenticators are used for secure access by many public and private organizations.

If the user chooses fingerprint identification, the user may be authenticated with a simple swipe of the finger. An authentication device 347 configured to obtain fingerprint biometrics may be used to obtain the user's fingerprint. Once such device is provided by BIO-key International of New Jersey. In the BIO-key device, fingerprint samples are converted to a template with over 2000 coordinate points and vector data. Fingerprint templates are not reversible, providing security and privacy protection. A false identification may be made every 1 in 200,000,000 trys, therefore, making fingerprint biometrics very secure. Although embodiments are discussed with respect to the BIO-key device, embodiments are not limited to this configuration. Any device capable of capturing fingerprint biometrics may be used without departing from the scope of embodiments discussed herein.

Once the user selects the type(s) of authenticator, an email is sent to the primary email address associated with the user including final authenticator setup information. The user provides the information associated with the selected authenticator(s) using, for example, authentication device 347 of FIG. 3, if necessary, and is prompted to return to the referring organization resource to logon using the new safe user account.

Thus, once the user registers with the safe access system as discussed above, the user may access a referring organizations web site using the established safe user account. In particular, the user accesses a web site enabled resource (the referring organization) via the organization's legacy logon screen. The user selects a registration link and is redirected to the safe access system web site. The user chooses the option to log in as a registered user of the safer access system using their unique account ID, authenticator(s) and primary registered e-mail account. Once authenticated, the user selects to register the referring organization's web site with the safe access system. Upon registration of the referring organizations' web site, the user is returned to the referring organization's web site and is prompted to authenticate using their original ID associated with the referring organization and the authenticator(s) associated with the user's safe account. The safe access system sends a registration confirmation e-mail to the primary e-mail account of record.

It will be understood that if the user has already registered the referring organization with the safe access system in accordance with some embodiments, the user can simply log into the already registered referring organization using their original ID associated with the referring organization and the authenticator(s) associated with the user's safe account. In other words, the user does not have to register the referring organization with the safe access system each time the user accesses the resources thereof.

Thus, according to some embodiments, the safe access system uses a variety of methods to ensure that the connection being made is secure. For example, some embodiments use four factors: something you know, for example, a user name and password; something you have, for example, device identification and statistical device identification; something you do, for example, behavioral profiling; and something you know or have, for example, the authenticator. All of this information may be provided to a risk engine, which assesses the risk of any action. Some embodiments may provide strengthened conventional password authentication by silently applying this risk-based analysis. For example, the risk engine may determine if the user is authenticating from a known device, if the user's behavior matches known characteristics and the like. Authentication attempts identified as "risky" may require additional validation, for example, security questions or on-demand authentication.

It will be understood that each referring organization may have different security requirements. Some referring organizations may only need to know who the user is and others may want to know who the user is and have the user authenticate his/her identity using one or more authenticators as discussed above. Secure access systems in accordance with embodiments discussed herein may be configured to handle different requirements associated with the different referring organizations.

Figure 3:
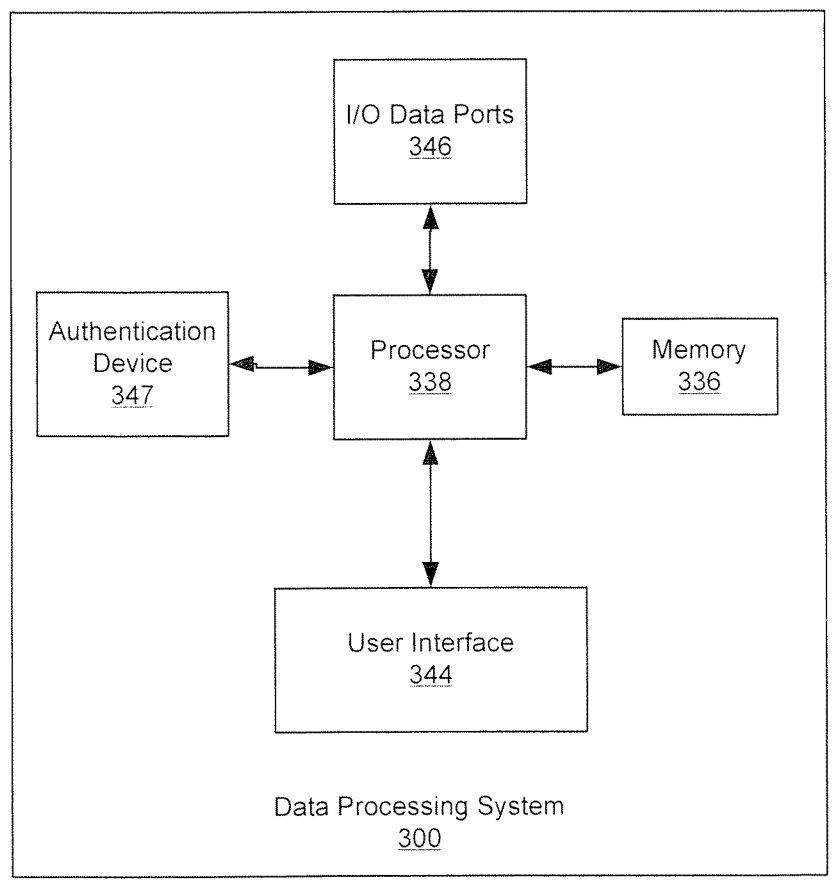
FIG. 3 is a block diagram of a data processing system suitable for use in some embodiments.

Referring now to FIG. 3, a data processing system 300 in accordance with some embodiments will be discussed. The data processing system 300 may be used by the secure access system in accordance with some embodiments. As illustrated in FIG. 3, the data processing system 300 may include a user interface 344, including, for example, input device(s) such as a keyboard or keypad, a display, a speaker and/or microphone, a memory 336 and an authentication device 347 that communicate with a processor 338. As discussed above, the authentication device 347 may be configured to provide data associated with one or more authenticators, for example, voice and/or fingerprint biometrics, in accordance with embodiments discussed herein. The data processing system 300 may further include I/O data port(s) 346 that also communicates with the processor 338. The I/O data ports 346 can be used to transfer information between the data processing system 300 and another computer system or a network, such as the Internet, using, for example, an Internet Protocol (IP) connection. These components may be conventional components such as those used in many conventional data processing systems, which may be configured to operate as described herein.

Figure 4:
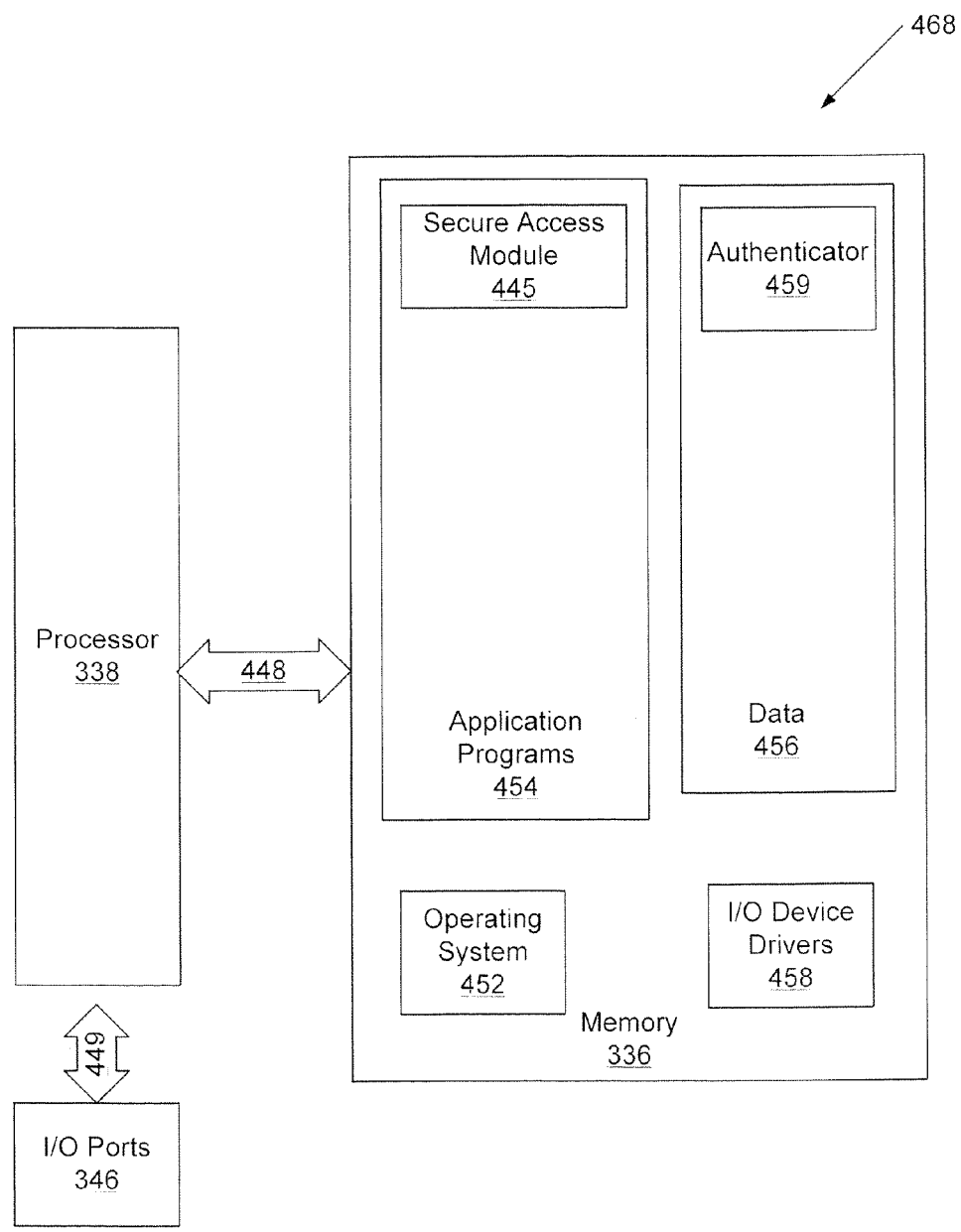
FIG. 4 is a more detailed block diagram of a system according to some embodiments.

Referring now to FIG. 4, a more detailed block diagram of a data processing system 468 for implementing systems, methods, and computer program products in accordance with some embodiments will now be discussed. It will be understood that the application programs and data discussed with respect to FIG. 4 below may be present in, for example, a safe access system in accordance with some embodiments without departing from the scope of embodiments discussed herein.

As illustrated in FIG. 4, the processor 338 communicates with the memory 336 via an address/data bus 448 and with I/O port 346 via address/data bus 449. The processor 338 can be any commercially available or custom enterprise, application, personal, pervasive and/or embedded microprocessor, microcontroller, digital signal processor or the like. The memory 336 may include any memory device containing the software and data used to implement the functionality of the data processing system 300. The memory 336 can include, but is not limited to, the following types of devices: ROM, PROM, EPROM, EEPROM, flash memory, SRAM, and DRAM.

As further illustrated in FIG. 4, the memory 336 may include several categories of software and data used in the system 468: an operating system 452; application programs 454; input/output (I/O) device drivers 458; and data 456. As will be appreciated by those of skill in the art, the operating system 452 may be any operating system suitable for use with a data processing system, such as OS/2, AIX or zOS from International Business Machines Corporation, Armonk, N.Y., Windows95, Windows98, Windows2000 or WindowsXP, Windows Vista, Windows7 or Windows CE from Microsoft Corporation, Redmond, Wash., Palm OS, Symbian OS, Cisco IOS, VxWorks, Unix or Linux. The I/O device drivers 458 typically include software routines accessed through the operating system 452 by the application programs 454 to communicate with devices such as the I/O data port(s) 346 and certain memory 336 components. The application programs 454 are illustrative of the programs that implement the various features of the system 468 and may include at least one application that supports operations according to embodiments. Finally, as illustrated, the data 456 may include authenticators 459, which may represent the static and dynamic data used by the application programs 454, the operating system 452, the I/O device drivers 458, and other software programs that may reside in the memory 336.

As further illustrated in FIG. 4, according to some embodiments, the application programs 454 include a secure access module 445. While the present invention is illustrated with reference to the secure access module 445 being an application program in FIG. 4, as will be appreciated by those of skill in the art, other configurations fall within the scope of embodiments discussed herein. For example, rather than being an application program 454, these circuits or modules may also be incorporated into the operating system 452 or other such logical division of the system 468. Furthermore, while the secure access module is illustrated in a single system 468, as will be appreciated by those of skill in the art, such functionality may be distributed across one or more systems. Thus, the embodiments discussed herein should not be construed as limited to the configuration illustrated in FIG. 4 but may be provided by other arrangements and/or divisions of functions between data accessing systems. For example, although FIG. 4 is illustrated as having a single module, more of these circuits/modules may be provided without departing from the scope of embodiments discussed herein.

The secure access module 445 may be configured to perform many of the tasks discussed above with respect to the secure access system. For example, the secure access module 445 may be configured to create a safe user account on a secure access system. The safe user account may be created based upon provision of one or more authenticators to be associated with a user of the secure access system. The authenticator(s) may be, for example, password, pass code, PIN, device authenticator, voice biometrics, soft token, fob token and/or fingerprint biometrics as discussed in detail above. In some embodiments, the authenticator(s) associated with the user of the secure access system may correspond to a level of security of the information being accessed from the referring organization. In other words, higher security measures may be taken with information that needs to be kept more secure.

The secure access module may be configured to allow access to a referring organization if a user provides a unique login and the authenticator(s) associated with the user to the secure access system. The referring organization should be registered with the secure access system as will be discussed below. The secure access module 445 may be configured to connect the user to the referring organization based on the unique login and the authenticator(s) provided to the secure access system.

In some embodiments, as discussed above, to use embodiments discussed herein with respect to a secure access system, a user must create a safe user account. A user may attempt to access the referring organization by logging in from a legacy logon screen associated with the network of the referring organization. At this point, the user may create the safe user account on the secure access system responsive to the attempt to access the referring organization.

In particular, a user may access the legacy logon screen associated with the referring organization. A link associated with secure access system may be selected for registration with the secure access system. Another link may be selected to create the safe user account on the secure access system. A primary email address may be provided to be associated with the safe user account. A challenge email is received at the primary email address and responded to by the user. One or more types of user authenticators to be associated with the safe user account may be selected responsive to a proper response to the challenge email. The user receives an email from the secure access system at the primary email address including authenticator setup information for the selected type(s) of authenticator(s). The user provides the information associated with the selected type(s) of authenticator(s) to the secure access system to finalize creation of the safe user account.

Once the user creates the safe user account, this account can be used to access information associated with a referring organization. In particular, the user may try to access the legacy logon screen of the referring organization. From here, the user may select a secure access registration link that is configured to connect to a web site associated with the secure access system. The user then selects an option to login to the network of the referring organization as a secure access user using the unique login, the authenticator and the primary email address associated with the user. The web site of the referring organization is registered with the secure access system. A user ID associated with the referring organization and the authenticator(s) are provided at the legacy logon screen of the referring organization. A registration confirmation email is received at the primary email address and the user may access the referring organization's information using the safe access system in accordance with embodiments discussed herein.

In some embodiments, once registered with the safe access system, users will use the registered primary e-mail as their logon ID going forward from registration and will receive confirmation e-mails from the safe access system for all activities they perform using the system. Thus, if a confirmation of an unknown activity is received at the primary email address, a breach of the security may be detected.

Figure 5:
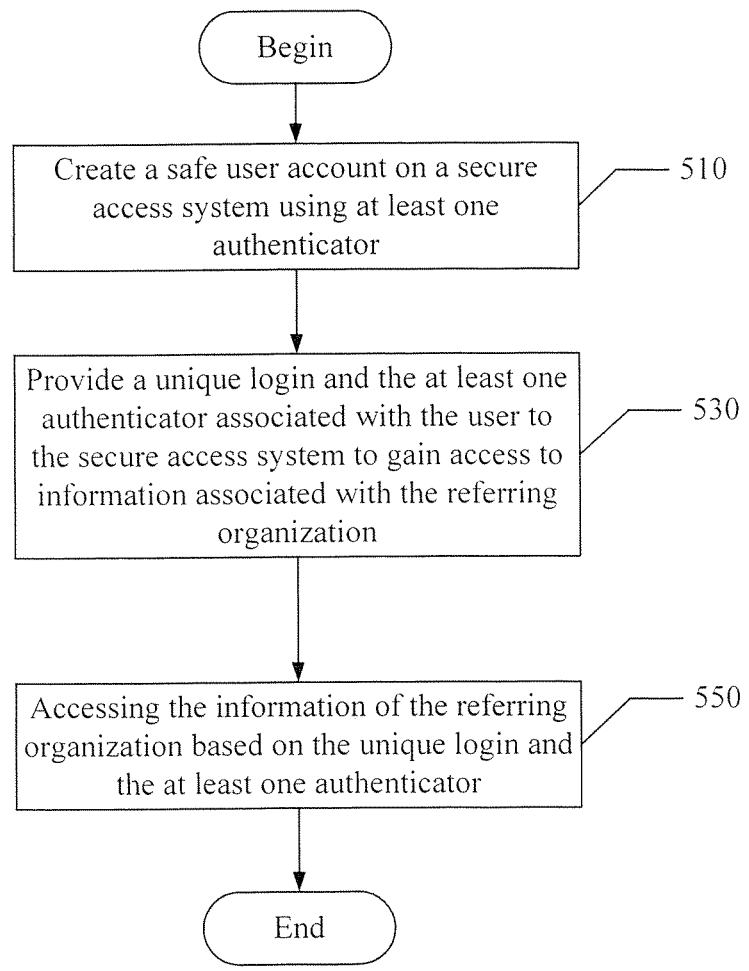
FIGS. 5 through 8 are flowcharts illustrating operations according to various embodiments.

Operations in accordance with various embodiments will now be discussed with respect to FIGS. 5 through 8. Referring first to FIG. 5, operations for providing secure communications begin at block 510 by creating a safe user account on a secure access system. Creating the safe user account may be based on provision of one or more authenticators to be associated with a user of the secure access system. The authenticator(s) may be, for example, voice biometrics, soft token, fob token and/or fingerprint biometrics as discussed in detail above. In some embodiments, the authenticator(s) associated with the user of the secure access system may correspond to a level of security of the information being accessed on the network associated with the referring organization. In other words, higher security measures may be taken with information that needs to be kept more secure.

A unique login and the authenticator(s) associated with the user are provided to the secure access system to gain access to the referring organization, the referring organization being registered with the secure access system (block 530). The user may be connected to the referring organization based on the unique login and the authenticator(s) provided to the secure access system (block 550).

Figure 6:
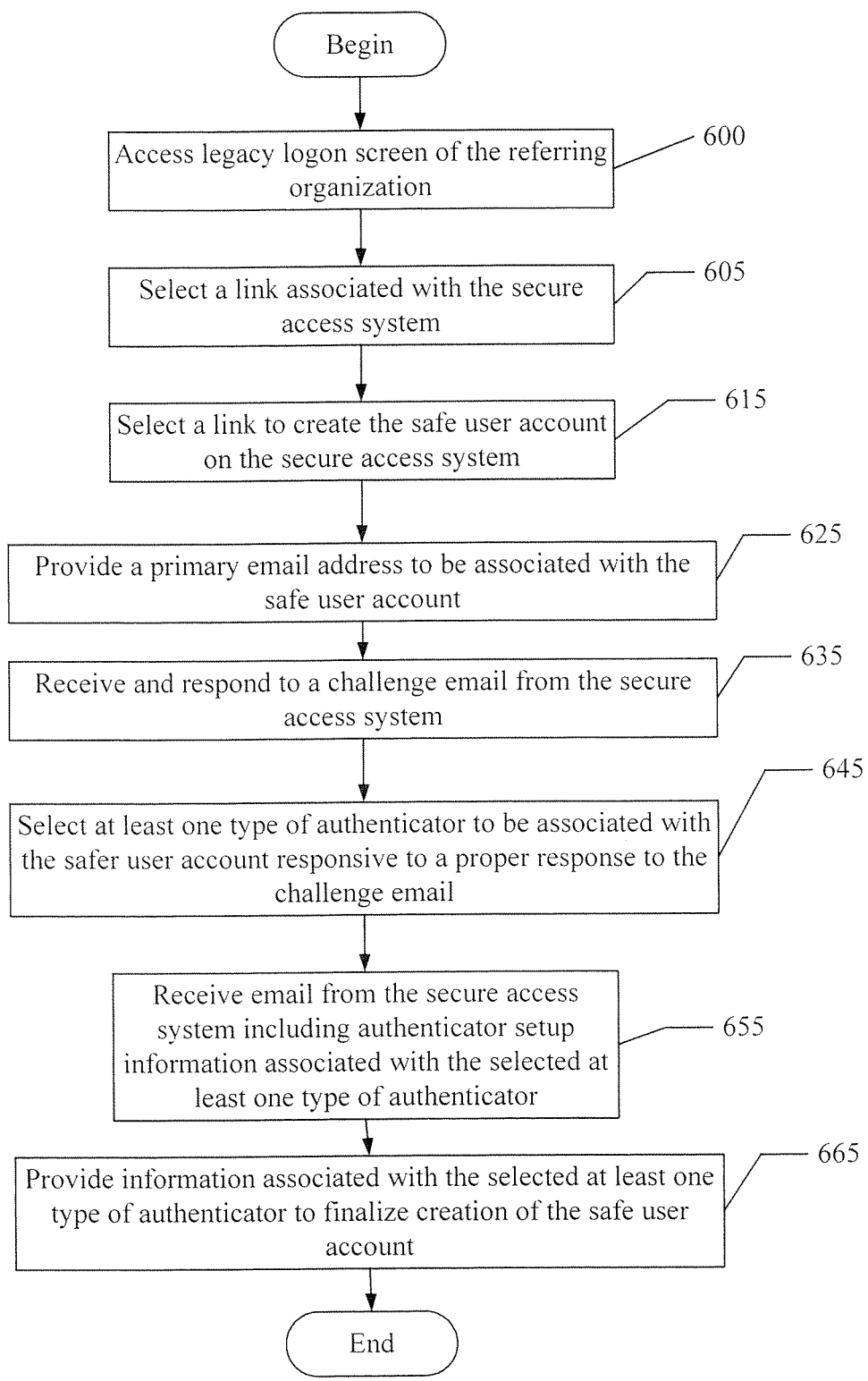

Referring now to FIG. 6, operations for creating a safe user account begin at block 600 by accessing the legacy logon screen associated with the referring organization. A link associated with secure access system registration for the secure access system is selected (block 605). A link to create the safe user account on the secure access system is selected (block 615). A primary email address to be associated with the safe user account is provided (block 625). A challenge email is received at the primary email address and the user responds to the challenge email (block 635). One or more types of user authenticators are selected to be associated with the safe user account responsive to a proper response to the challenge email (block 645). An email from the secure access system is received at the primary email address including authenticator setup information for the selected type(s) of authenticator (s) (block 655). Information associated with the selected type(s) of authenticator(s) is provided to the secure access system to finalize creation of the safe user account (block 665).

Figure 7:
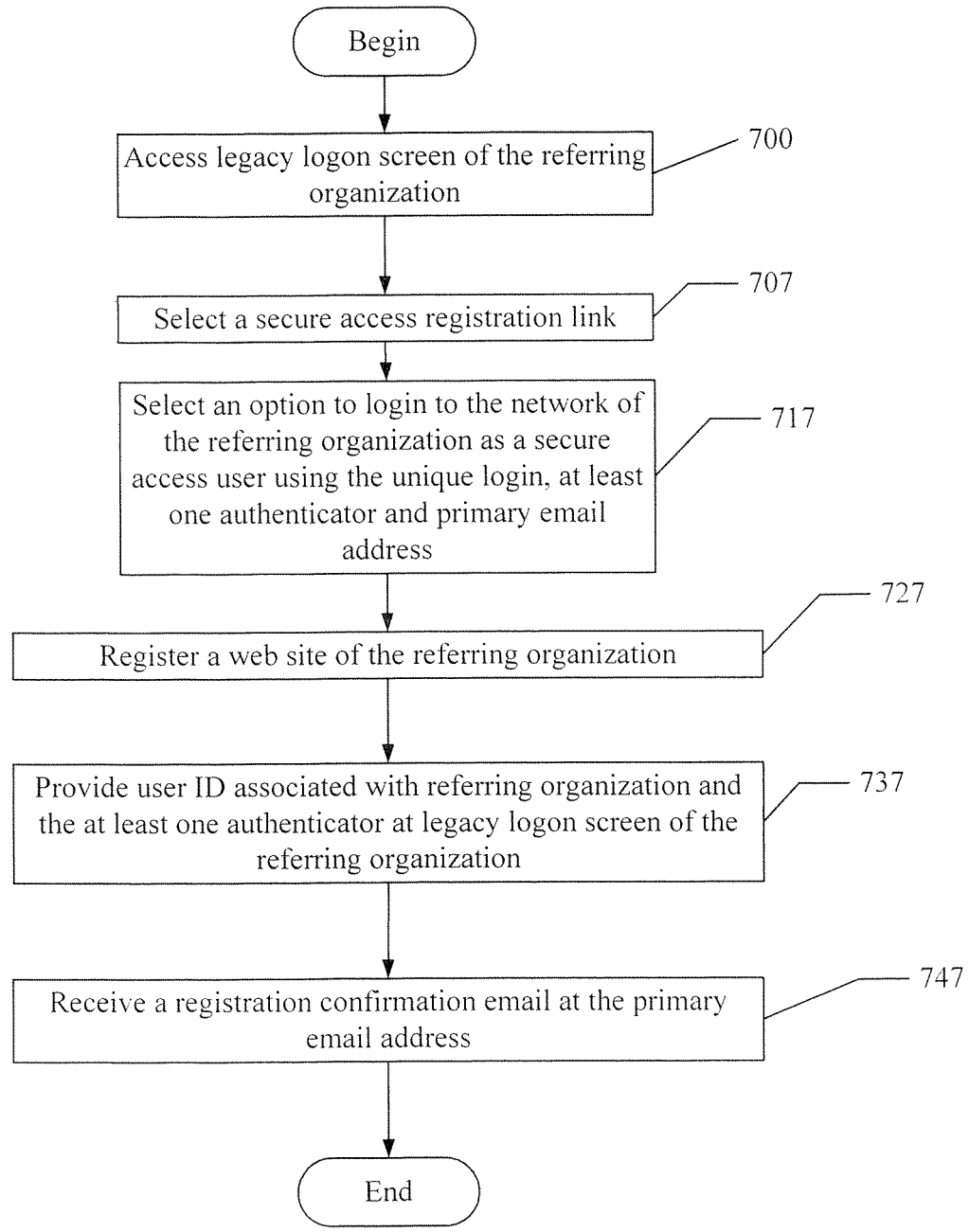

Operations for accessing a referring organization using the secure access system will now be discussed with respect to FIG. 7. Operations begin at block 700 by accessing the legacy logon screen of the network of the referring organization. A secure access registration link is selected that is configured to connect to a web site associated with the secure access system (block 707). An option to login to the network of the referring organization as a secure access user using the unique login, the authenticator(s) and the primary email address associated with the user is selected (block 717). A web site of the referring organization is registered (block 727). A user ID associated with the referring organization and the authenticator(s) are provided at the legacy logon screen of the referring organization (block 737) and a registration confirmation email is received at the primary email address (block 747).

Figure 8:
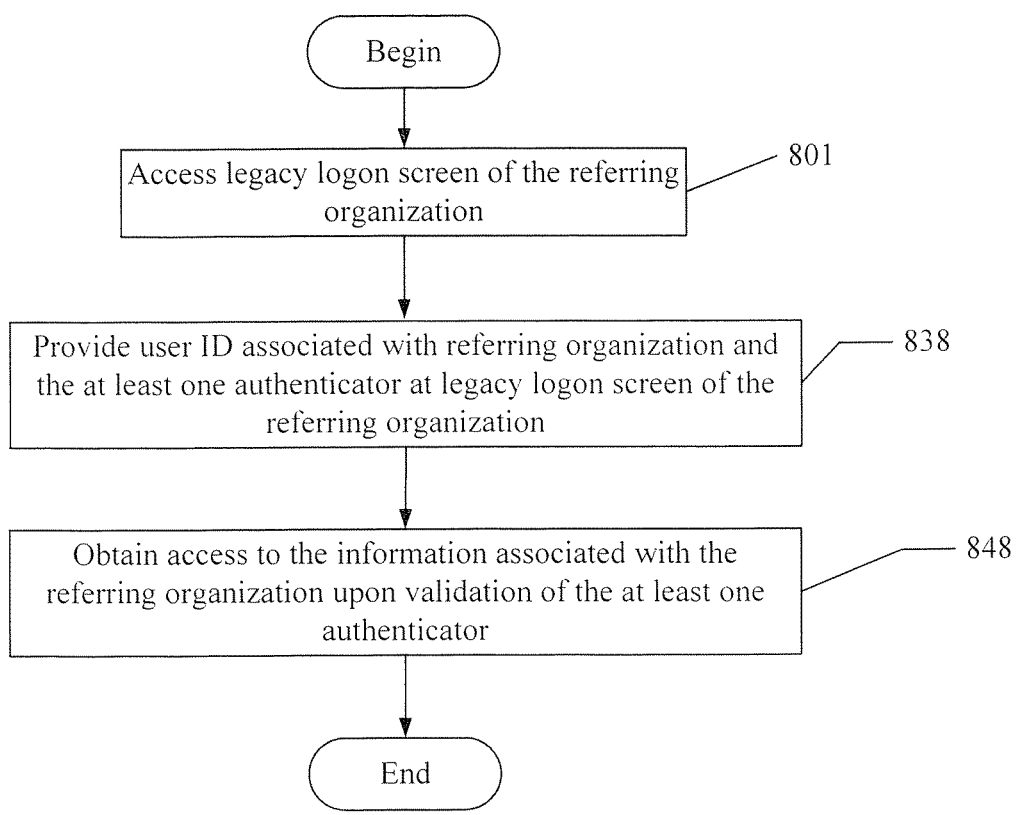

Operations for accessing a referring organization that has already been registered with the safe access system will not be discussed with respect to FIG. 8. As illustrated in FIG. 8, operations begin at block 801 by accessing the legacy logon screen of the referring organization. A user ID associated with the referring organization and the at least one strong authenticator is provided at the legacy logon screen of the referring organization (block 838). Secure access to the information associated with the referring organization is obtained if the at least one strong authenticator is determined to be valid (block 848).

The flowcharts of FIGS. 5-8 illustrate the architecture, functionality, and operations of embodiments of methods, systems, and/or computer program products for tracking information on the Internet. In this regard, each block represents a module, segment, or portion of code, which comprises one or more executable instructions for implementing the specified logical function(s). It should also be noted that in other implementations, the function(s) noted in the blocks may occur out of the order noted in FIGS. 5-8. For example, two blocks shown in succession may, in fact, be executed substantially concurrently or the blocks may sometimes be executed in the reverse order, depending on the functionality involved.

According to some embodiments discussed above with respect to FIGS. 1 through 8, a secure online user experience may be provided anywhere, anyplace, anytime. As discussed above, the online experience may be secured using strong authentication services by creating a cloud based authentication clearinghouse, such as token and voice and fingerprint biometric.

Many variations and modifications can be made to the embodiments without substantially departing from the principles of the present invention. All such variations and modifications are intended to be included herein within the scope of the present invention, as set forth in the following claims.

That which is claimed:

1. A method of providing secure communications, comprising:
    receiving, at a processor associated with a secure access system, a request to create, on the secure access system, a safe user account for a user to enable the user to access resources associated with a referring organization, the user associated with an identification, the identification associated with the referring organization;
    in response to the request, providing, by the processor, a plurality of types of authenticators for association with the safe user account;
    receiving, by the processor, a selection of a type of authenticator;
    in response to receiving the selection of the type of authenticator, providing, by the processor to the user, a message requesting setup information associated with an authenticator corresponding to the type of authenticator selected;
    in response to receiving the setup information, creating the safe user account for the user and associating the authenticator with the safe user account; and
    receiving, at the processor from the user, the identification associated with the referring organization and the authenticator associated with the safe user account to gain access to the resources associated with the referring organization.

2. The method of claim 1, further comprising prior to receiving the request to create the safe user account, receiving an attempt to access the referring organization from a legacy logon screen associated with the referring organization.

3. The method of claim 1, further comprising in response to receiving the request to create the safe user account, providing a challenge message to the user, the challenge message comprising a first email having a link to the secure access system, wherein the message requesting the setup information associated with the authenticator corresponding to the type of authenticator selector comprises a second email.

4. The method of claim 1, further comprising:
    after receiving the identification associated with the referring organization and the authenticator associated with the safe user account from the user, receiving a selection to register a web site of the referring organization with the secure access system; and providing a registration confirmation email to the user.

5. The method of claim 1, further comprising providing access to the resources associated with the referring organization based on validity of the identification associated with the referring organization and the authenticator associated with the safe user account.

6. The method of claim 1, wherein the plurality of types of authenticators comprises voice biometrics, soft token, fob token, fingerprint biometrics, passwords, pass phrases, PIN and device authenticator.

7. The method of claim 1, wherein the plurality of types of authenticators provided corresponds to a level of security of the resources associated with the referring organization.

8. The method of claim 1, wherein the referring organization defines the plurality of types of authenticators provided.

9. A system for providing secure communications, the system comprising:
   a processor; and
   a memory comprising computer-executable instructions that, when executed by the processor, cause the processor to perform operations comprising
      receiving a request to create, on a secure access system, a safe user account for a user to enable the user to access resources associated with a referring organization, the user associated with an identification, the identification associated with the referring organization,
      in response to the request, providing a plurality of types of authenticators for association with the safe user account,
      receiving a selection of a type of authenticator,
      in response to receiving the selection of the type of authenticator, providing a message to the user of the safe user account, the message requesting setup information associated with an authenticator corresponding to the type of authenticator selected, the authenticator associated with the safe user account,
      in response to receiving the setup information, creating the safe user account for the user and associating the authenticator with the safe user account, and
      receiving, from the user, the identification associated with the referring organization and the authenticator associated with the safe user account to gain access to the resources associated with the referring organization.

10. The system of claim 9, wherein the memory comprises further computer-executable instructions that, when executed by the processor, cause the processor to perform operations comprising prior to receiving the request to create the safe user account, receiving an attempt to access the referring organization a legacy logon screen associated with the referring organization.

11. The system of claim 9, wherein the memory comprises further computer-executable instructions that, when executed by the processor, cause the processor to perform operations comprising in response to receiving the request to create the safe user account, providing a challenge message to the user, the challenge message comprising a first email having a link to the secure access system, wherein the message requesting the setup information associated with the authenticator corresponding to the type of authenticator selector comprises a second email.

12. The system of claim 9, wherein the memory comprises further computer-executable instructions that, when executed by the processor, cause the processor to perform operations comprising:
   after receiving the identification associated with the referring organization and the authenticator associated with the safe user account from the user, receiving a selection to register a web site of the referring organization with the secure access system; and
   providing a registration confirmation email to the user.

13. The system of claim 9, wherein the plurality of types of authenticators comprises voice biometrics, soft token, fob token, fingerprint biometrics, passwords, pass phrases, PIN and device authenticator.

14. The system of claim 9, wherein the plurality of types of authenticators provided corresponds to a level of security of the resources associated with the referring organization being accessed.

15. A computer readable medium device comprising computer-executable instructions stored thereon which, when executed by a computer, cause the computer to perform operations comprising:
   receiving a request to create, on a secure access system, a safe user account for a user to enable the user to access resources associated with a referring organization, the user associated with an identification, the identification associated with the referring organization;
   in response to the request, providing a plurality of types of authenticators for association with the safe user account;
   receiving a selection of a type of authenticator;
   in response to receiving the selection of the type of authenticator, providing a message to a user of the safe user account, the message requesting setup information associated with an authenticator corresponding to the type of authenticator selected, the authenticator associated with the safe user account;
   in response to receiving the setup information, creating the safe user account for the user and associating the authenticator with the safe user account; and
   receiving, from the user, the identification associated with the referring organization and the authenticator associated with the secure user account to gain access to the resources of the referring organization.

16. The computer readable medium device of claim 15, comprising further computer-executable instructions stored thereon which, when executed by the computer, cause the computer to perform operations comprising prior to receiving the request to create the safe user account, receiving an attempt to access the referring organization from a legacy logon screen associated with the referring organization.

17. The computer readable medium device claim 15, comprising further computer-executable instructions stored thereon which, when executed by the computer, cause the computer to perform operations comprising in response to receiving the request to create the safe user account, providing a challenge message to the user, the challenge message comprising a first email having a link to the secure access system, wherein the message requesting the setup information associated with the authenticator corresponding to the type of authenticator selector comprises a second email.

18. The computer readable medium device of claim 15, comprising further computer-executable instructions stored thereon which, when executed by the computer, cause the computer to perform operations comprising:
   after receiving the identification associated with the referring organization and the authenticator associated with the safe user account, receiving a selection to register a web site of the referring organization with the secure access system; and providing a registration confirmation to the user.

19. The computer readable medium of claim 15, wherein the plurality of types of authenticators comprises voice biometrics, soft token, fob token, fingerprint biometrics, passwords, pass phrases, PIN and device authenticator.

20. The computer readable medium of claim 15, wherein the plurality of types of authenticators provided corresponds to a level of security of the resources associated with the referring organization being accessed.

\* \* \* \* \*